United States Patent
Alfred

(10) Patent No.: US 6,393,275 B1
(45) Date of Patent: *May 21, 2002

(54) CELLULAR EXTENSION SERVICE USING SINGLE LINE AND MULTIPLE CELLULAR TELEPHONE SETS

(75) Inventor: Joseph Anderson Alfred, Somerset, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,366

(22) Filed: Dec. 27, 1996

(51) Int. Cl.[7] ............ H04Q 7/20; H04M 13/00
(52) U.S. Cl. ................... 455/422; 379/177
(58) Field of Search .............. 455/402, 414, 455/445, 552, 419, 405, 422; 379/27, 127, 179, 177

(56) References Cited

U.S. PATENT DOCUMENTS

| | | | |
|---|---|---|---|
| 4,979,207 A | * 12/1990 | Baum et al. | |
| 5,046,082 A | * 9/1991 | Zicker et al. | |
| 5,233,642 A | * 8/1993 | Renton | |
| 5,371,781 A | * 12/1994 | Ardon | 455/445 |
| 5,442,683 A | 8/1995 | Hoogeveen | |
| 5,457,736 A | * 10/1995 | Cain et al. | |
| 5,504,804 A | 4/1996 | Widmark et al. | |
| 5,506,887 A | * 4/1996 | Emery et al. | |
| 5,511,111 A | * 4/1996 | Serbetcioglu et al. | |
| 5,521,963 A | 5/1996 | Schrader et al. | |
| 5,541,977 A | 7/1996 | Hodges et al. | |
| 5,544,235 A | * 8/1996 | Ardon | 379/177 |
| 5,570,413 A | * 10/1996 | Ahlberg et al. | |
| 5,600,704 A | * 2/1997 | Ahlberg et al. | |
| 5,657,372 A | * 8/1997 | Ahlberg et al. | |
| 5,699,407 A | * 12/1997 | Nguyen | |
| 5,749,052 A | * 5/1998 | Hidem et al. | |

FOREIGN PATENT DOCUMENTS

| | | |
|---|---|---|
| EP | 0 711 090 A2 | 5/1996 |
| GB | 2 278 759 A | 8/1994 |

OTHER PUBLICATIONS

Federal Communication Commision, "Cellular Frequently Asked Question", May 1999.*
Federal Communication Commision, 45 CFR Chapter 1, p. 196, Oct. 1998.*
EPC Search Report for EP 97 30 7603, Apr. 25, 2000.

* cited by examiner

Primary Examiner—William Cumming
(74) Attorney, Agent, or Firm—Morgan & Finnegan, LLP

(57) ABSTRACT

Multiple cellular telephones, each having a unique ESN, share the same cellular telephone number (MIN). Data records at the MSC are modified to reflect the parent and extension cellular telephones configuration. Incoming calls are delivered to all telephones sharing a MIN simultaneously, sequentially, or in accordance with a caller's selection. An extension wireless telephone may interrupt a call in progress of another extension wireless telephone. Cellular telephones sharing a MIN may call each other using intercom extension numbers.

12 Claims, 4 Drawing Sheets

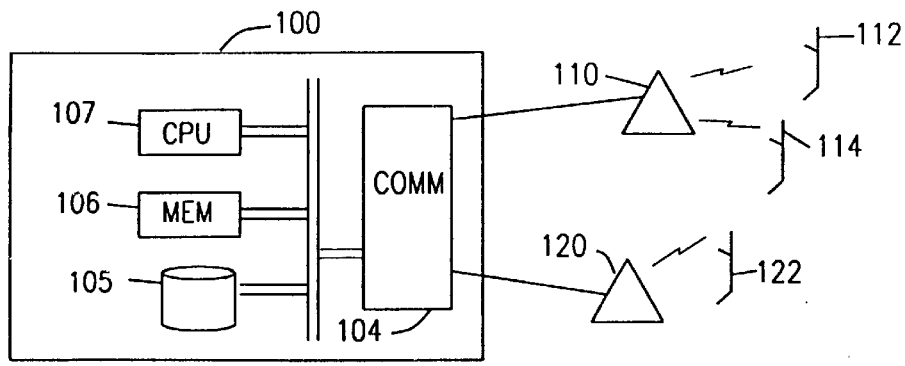
(PRIOR ART)
*FIG. 1*
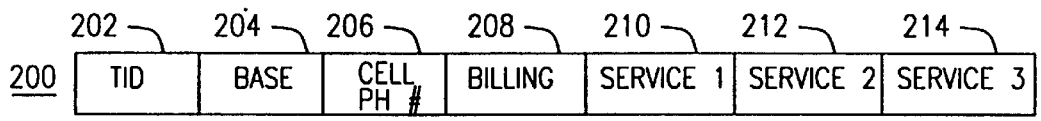
(PRIOR ART) *FIG. 2*
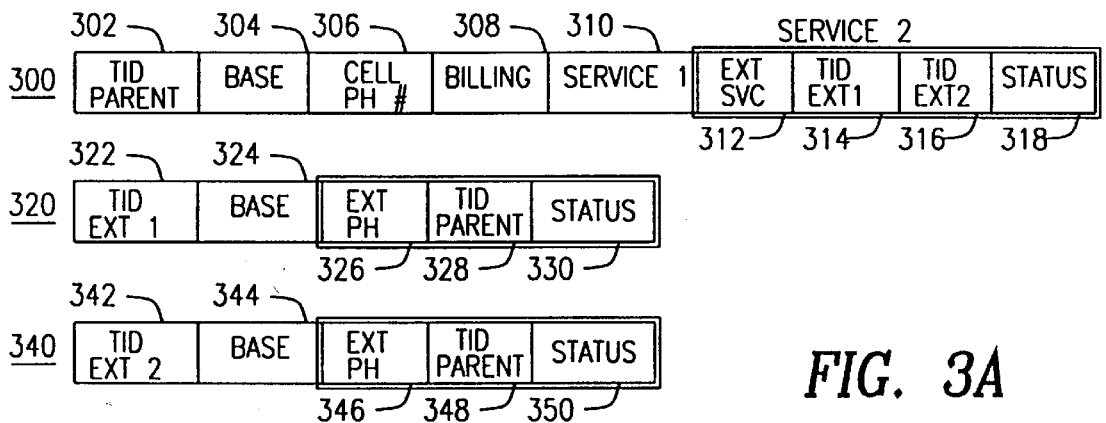
*FIG. 3A*
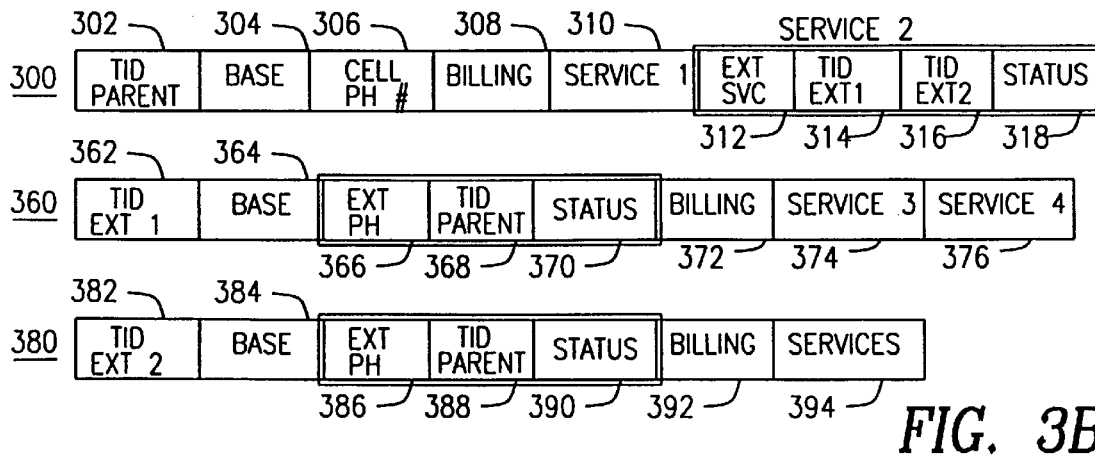
*FIG. 3B*

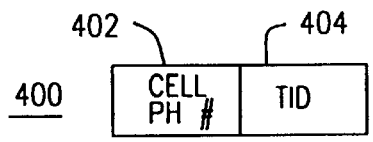
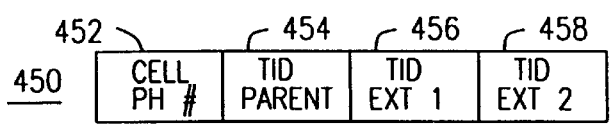
(PRIOR ART)
FIG. 4
FIG. 5
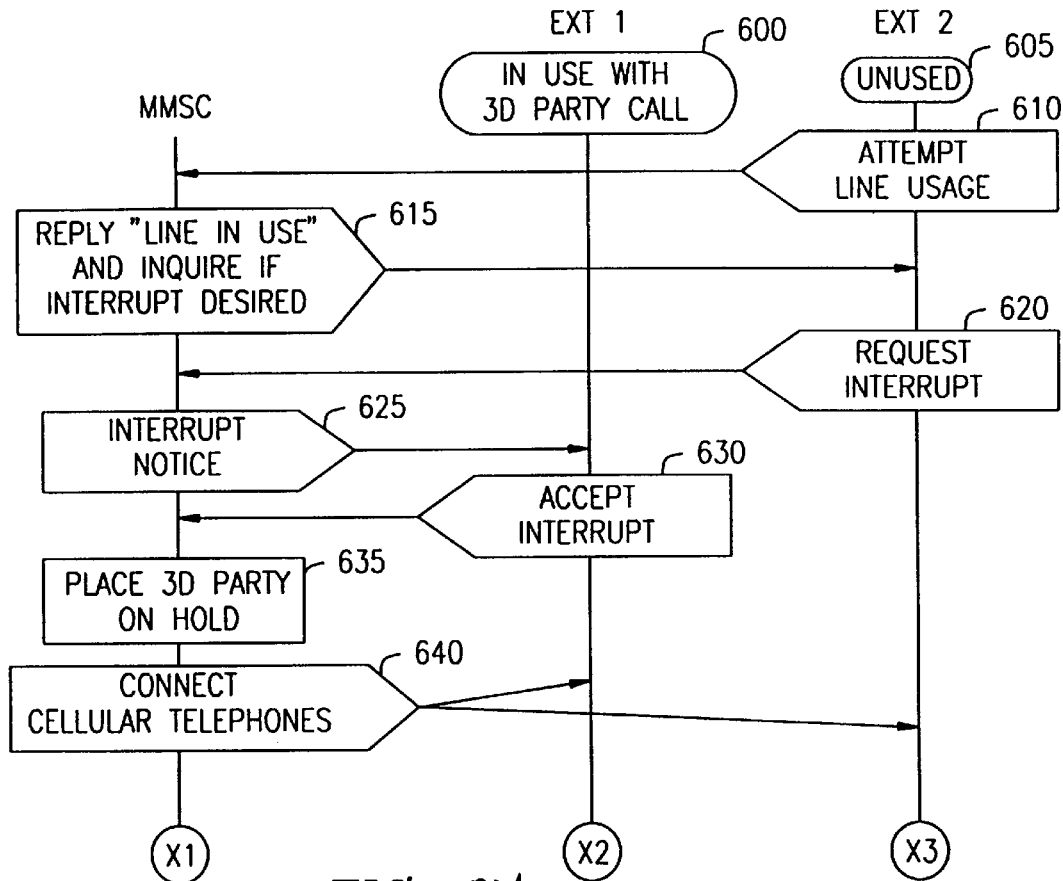
FIG. 7A
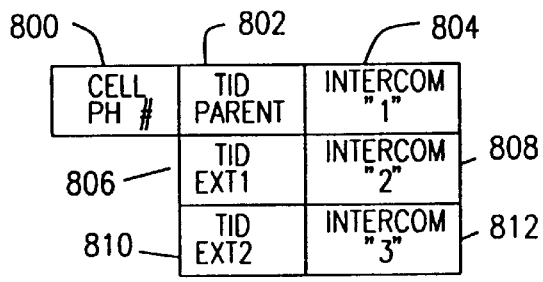
FIG. 8

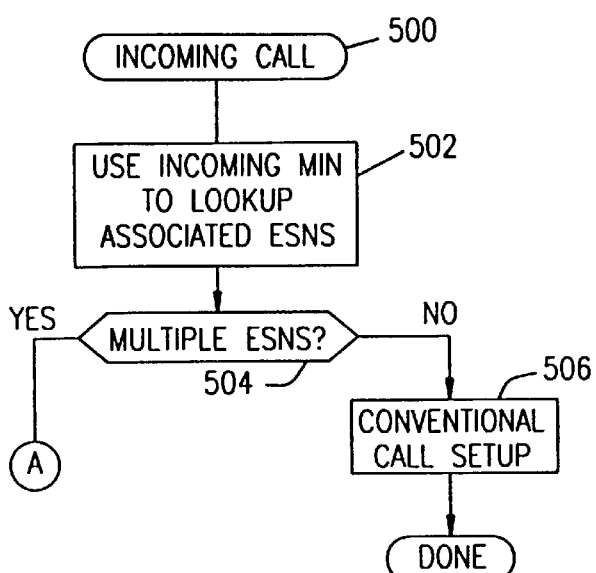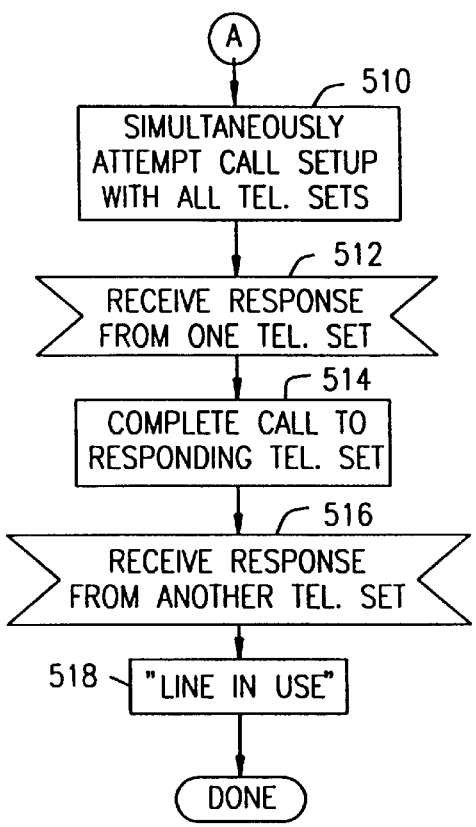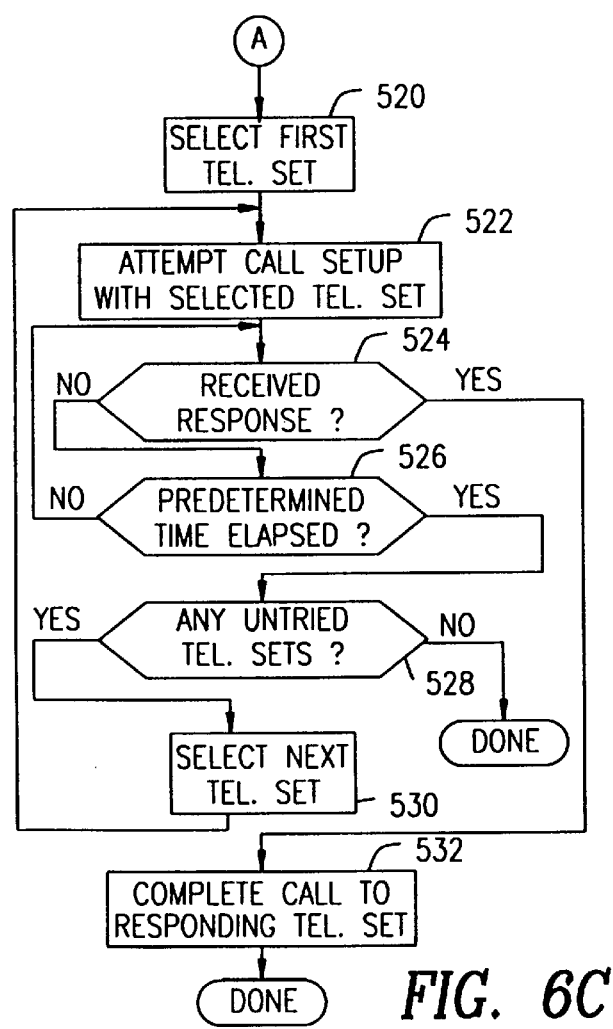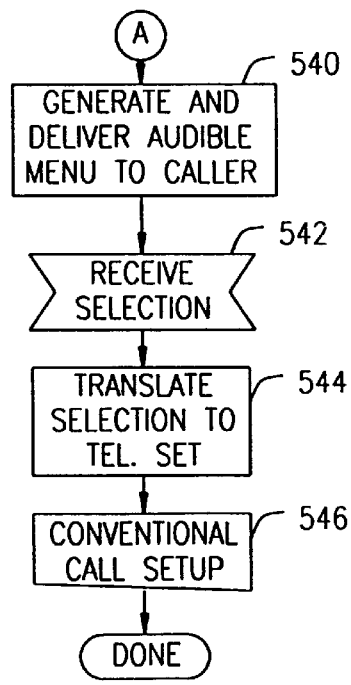
FIG. 6A
FIG. 6B
FIG. 6C
FIG. 6D

CELLULAR EXTENSION SERVICE USING SINGLE LINE AND MULTIPLE CELLULAR TELEPHONE SETS

BACKGROUND OF THE INVENTION

The present invention relates to wireless communication services, and, more particularly, is directed to enabling one cellular telephone to appear to be an extension of another cellular telephone.

Presently, a cellular telephone line is associated with one cellular telephone set, whereas a wire line can be associated with plural telephone sets. Consequently, cellular telephone users, both commercial and residential, are precluded from advantages available to wire line users having wire line extension phones such as the convenience of rapid dialing between extension telephone sets and cost savings due to aggregating usage.

A regulation of the Federal Communications Commission, 47 C.F.R. § 22.919, prohibits tampering with an electronic serial number (ESN), which is the unique identifier of a cellular mobile transmitter. In other words, it is illegal to provide a cellular extension telephone by altering the ESN of a first cellular telephone to be the same as the ESN of a second cellular telephone.

SUMMARY OF THE INVENTION

In accordance with an aspect of this invention, a method of and a system for configuring cellular telephones to share a cellular telephone line number are provided in which one of the cellular telephones is defined as a parent and the other cellular telephones are defined as extensions.

Identification information for the extension cellular telephones is included in a data record associated with the parent cellular telephone, and identification information for the parent cellular telephone is included in data records respectively associated with the extension cellular telephones.

A data record associates the shared cellular telephone line number with the parent and extension cellular telephones.

A call is set up to a cellular telephone line number having a plurality of associated cellular telephones, by using the cellular telephone number to obtain information identifying the plurality of associated cellular telephones, and delivering call setup signals to at least two of the associated cellular telephones. The call setup signals are delivered simultaneously or sequentially.

Alternatively, a call is set up by delivering an audible menu signal to the caller, translating a response signal received from the caller to a selected one of the cellular telephones associated with the cellular telephone line number, and delivering a call setup signal to the selected cellular telephone.

A first cellular telephone interrupts a call in progress of a second cellular telephone sharing a cellular telephone line number with the first cellular telephone by having a central facility receive an interrupt request signal from the first cellular telephone, produce an interrupt notice signal, and transmit the interrupt notice signal to the second cellular telephone.

A first cellular telephone places a call to a second cellular telephone sharing a cellular telephone line number with the first cellular telephone by having a central facility receive an intercom extension number associated with the first cellular telephone from the second cellular telephone, and deliver a call setup request to the first cellular telephone.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 1 is a diagram of a cellular communication system;

FIG. 2 is a chart depicting a conventional data record for a cellular telephone line;

FIGS. 3A and 3B are charts each depicting data records for a cellular telephone line and its cellular extension lines;

FIG. 4 is a chart depicting a record of a conventional index showing a cellular telephone line number and its associated cellular telephone;

FIG. 5 is a chart depicting a record of an index showing a cellular telephone line number and its associated cellular telephones according to the present invention; and FIGS. 6A–6D are flowcharts depicting a call setup to a wireless telephone number having multiple wireless telephone sets associated therewith;

FIGS. 7A–7D are flowcharts depicting a cellular extension interrupt attempt; and FIG. 8 is a chart depicting a table of intercom extension numbers maintained at the MISC.

DETAILED DESCRIPTION OF THE PREFERRED EMBODIMENTS

Figure 7B:
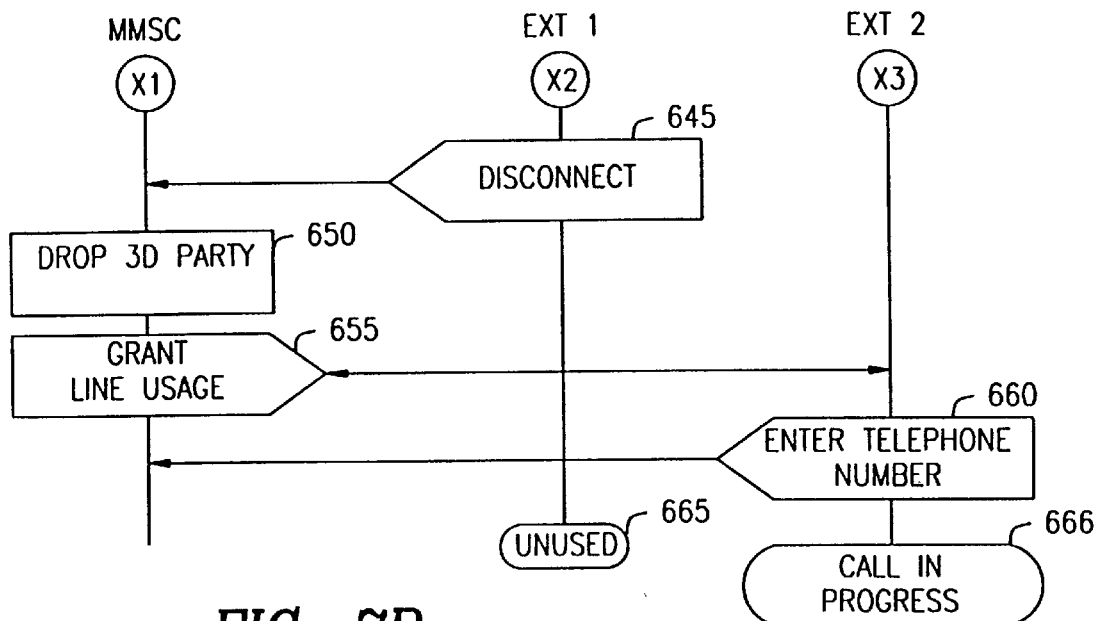

According to the present inventive technique, multiple cellular telephones, each having a unique identifier, function in a configuration of parent telephone and extension telephones in accordance with data records in a communications system. As used herein and in the claims, cellular refers to a wireless communication service between a customer and a communication network, such as Personal Communications Service (PC's).

Referring now to the drawings, and in particular to FIG. 1, there is illustrated a conventional cellular communication system including mobile switching center (MSC) 100 having processor 107, communications interface 104, storage 105 for storing data records and memory 106 for holding data records currently in use by MSC 100, base stations 110, 120, and cellular telephones 112, 114, 122. MSC 100 maintains data records for a plurality of cellular telephone lines and their corresponding cellular telephones. Base stations 110, 120 are assumed to have minimal or no data record storage capability, although in other embodiments, base stations 110, 120 maintain data records for the cellular telephones associated therewith. Communications interface 104 provides communication signals to base stations 110, 120 for transmission to cellular telephones 112, 114, 122.

Cellular telephones 112, 114, 122 include a memory containing a unique terminal identifier (TID) referred to in the United States as an electronic serial number (ESN). Alternatively, cellular telephones 112, 114, 122 may each be adapted to receive a removable card which electronically provides a unique TID, as defined in, for example, ITU standard E.212.

FIG. 2 shows a conventional data record 200 maintained by MSC 100 for cellular telephone 112, including the following fields: terminal identifier (TID) or ESN 202, base station 204, cellular telephone line number or mobile identification number (MIN) 206, billing information 208, and information for each service for which cellular telephone 112 has subscribed, such as call waiting, call forwarding, caller ID and so on, represented as services 210, 212, 214.

Base station field 204 represents the designator used by MSC 100 to indicate the base station with which cellular telephone 112 is associated, for example, base station 110.

Cellular telephone line field 206 indicates the ten digit directory line number or MIN associated with cellular telephone 112, for example, "(212) 123-4567". In FIG. 2, ESN field 202 is the index (first) field of a record; however, in some embodiments, MIN field 206 is the index field of a record.

Billing information field 208 represents which customer should be charged for usage associated with cellular telephone 112.

As known to one of ordinary skill in the art, service fields 210, 212, 214 contain information identifying the particular service, appropriate predefined information, sometimes referred to as profile information, and real time status information, as needed.

To practice the inventive technique, MSC 100 is modified to accommodate richer data records than data record 200, enabling multiple cellular telephones to use the same cellular telephone line. Modified MSC 100 is henceforth referred to as MMSC.

FIG. 3A shows parent data record 300 and extension data records 320, 340. Fields common to data records 300, 320, 340 and data record 200 are not described for brevity. Data records 300, 320, 340 are associated with cellular telephones 112, 114, 122, respectively.

Data record 300 includes TID field 302 representing the TID for cellular telephone 112. Data record 300 includes cellular extension service information, indicated by the double line box labeled "SERVICE2", including the following fields: cellular extension service identifier 312, extension TIDs 314, 316 and status information 318. In one embodiment, cellular extension service identifier 312 includes information identifying data record 300 as the parent of other extensions; in another embodiment, MMSC uses the fact that a standard telephone number is present in cellular telephone line field 306 to determine that cellular telephone 112 is a parent of other extensions. Extension TID fields 314, 316 represent the TIDs for the cellular telephones designated as extension telephones by the customer having cellular telephone 112; fields 314, 316 may be considered as representing pointers to data records 320, 340. While two extension cellular telephones are accommodated in data record 300, it will be appreciated that one or more than two cellular telephones may be similarly accommodated.

Data record 320 includes TID field 322 representing the TID for cellular telephone 114. However, instead of a cellular telephone line number, data record 320 includes extension telephone field 326 identifying cellular telephone 114 as a cellular extension telephone, TID field 328 representing the TID of parent cellular telephone 112, and status information 330. TID field 328 may be considered as representing a pointer to data record 300.

Data record 340 includes TID field 342 representing the TID for cellular telephone 122, and is otherwise similar to data record 320.

A conventional line usage attempt is described in U.S. Pat. No. 5,541,977 (Hodges et al.), the disclosure of which is hereby incorporated by reference.

Conventional authentication processing requires only that there be a unique ESN for each telephone set, and does not rely on a one-to-one correspondence between a MIN and an ESN. Consequently, use of extension cellular telephones as described herein can be accomplished without modification to existing authentication procedures and equipment.

During a line usage attempt of, for example, extension cellular telephone 114, MMSC uses TID field 328 to access data record 300. MMSC checks that the TID for cellular telephone 114 is included in the extension service information of data record 300; in this example, MMSC checks that TID field 314 contains the TID for cellular telephone 114. If the TID of the cellular telephone attempting line usage is not in data record 300, line usage is denied. If line usage is granted, MMSC arranges for the call involving cellular telephone 114 to effectively inherit billing information 208 and service information 310 of cellular telephone 112.

If a cellular telephone set attempting to use a cellular telephone line is a visitor, that is, its home MSC is other than MMSC, conventional visitor location register procedures are used by MMSC to accommodate the visiting cellular telephone set.

If one of cellular telephones 112, 114, 122 is a visitor at another MSC, then MMSC serves as its home MSC. In one embodiment, MMSC performs only conventional authentication processing, so it is possible for two or more of cellular telephones 112, 114, 122 to be simultaneously communicating with respectively different third parties. In this case, it appears that multiple cellular telephone lines are available to the cellular telephones sharing a cellular telephone line. In another embodiment, during authentication processing for a visiting one of cellular telephones 112, 114, 122, MMSC is modified to also check whether any of the cellular telephones sharing the cellular telephone line with the visiting cellular telephone are in use; if so, usage is denied to the visiting cellular telephone. In this case, the concept of a shared cellular telephone line is strictly enforced.

FIG. 3B shows parent data record 300 and extension data records 360, 380.

Fields previously described are omitted from this description for brevity. Data records 300, 360, 380 are associated with cellular telephones 112, 114, 122, respectively. The difference between the data records of FIGS. 3A and 3B is that the cellular extension telephone records in FIG. 3B include billing information 372, 392, and service information 374, 376, 394, so that usage can be billed to separate customers, and so that each cellular extension telephone can have its own predefined services, rather than effectively inheriting the services defined for cellular telephone 112.

Incoming Calls

Call setup for calls attempting to reach cellular telephones 112, 114, 122 will now be described.

FIG. 4 shows data record 400 of a conventional index file maintained in MSC 100 of FIG. 1, including: cellular telephone line number (or MIN) field 402 and TID (or ESN) field 404. For cellular telephone 112, the information in fields 402, 404 is identical to the information in fields 206, 202, respectively. When a call setup request for the telephone number associated with cellular telephone 112 arrives at MSC 100, data record 400 is used to obtain the TID, and then to access data record 200. MSC 100 then sends a call setup signal to base station 110 for delivery to cellular telephone 112. FIG. 5 shows data record 450 of an index file maintained in MMSC to practice the inventive technique, including the following fields: cellular telephone line number 452, parent TID 454 and extension TIDs 456, 458. The information in fields 452, 454 is the same as the information in fields 306, 302, 322 (or 314), 342 (or 316), respectively.

According to one embodiment of the inventive technique, notification of an incoming call is simultaneously delivered to all cellular telephones associated with a cellular telephone line. Specifically, as shown in FIG. 6A, at step 500, a call setup request for the telephone number associated with cellular telephones 112, 114, 122 arrives at MMSC; at step 502, MMSC uses data record 500 to obtain the TIDs thereof, and then to access data records 300, 320, 340. If there are no extension cellular telephones, then at step 506, the incoming call is conventionally processed.

If there are extension cellular telephones, then, as shown in step 510 of FIG. 6B, MMSC sends a call setup signal to base station 110 and base station 120, for delivery to cellular telephones 112, 114 and cellular telephone 122, respectively. At step 512, a first response is received. At step 514, the call is set up with the first responding telephone of cellular telephones 112, 114, 122. At step 516, another of the cellular telephones tries to respond, and at step 518, it receives a "line in use" message, and is offered the opportunity to interrupt, as described in detail below. Subsequent responses from other cellular telephones are treated similarly.

In a modification of this embodiment, if multiple cellular telephones respond to the call setup signal, all are bridged onto the call.

The above described embodiment is akin to conventional residential wire line extension telephone lines.

According to a different embodiment of the inventive technique, notification of an incoming call is sequentially delivered to all cellular telephones associated with a cellular telephone line. As shown, for example, in step 520 of FIG. 6C, cellular telephone 112 indicated by TID field 504 is first selected, and at step 522 MMSC attempts to setup the incoming call with cellular telephone 112. As shown at steps 524–526, if cellular telephone 112 does not respond to a call setup within a predetermined time, then, at steps 528–530 and 522, MMSC "rings" cellular telephone 114 indicated by TID field 506, and if there is no response within the predetermined time, MMSC "rings" cellular telephone 122 indicated by TID field 508. The MMSC may also produce a speech signal for delivery to the caller, such as, "Attempting to complete call, please stay on the line.", and if there is no response from cellular telephone 122 within the predetermined time, the MMSC may produce and deliver a speech signal to the caller such as, "The party you called did not respond. Please try again later." and then terminate the call setup. Alternatively, if any of the cellular telephones have call forwarding, the call is directed accordingly. As shown at steps 524 and 532, if any of the selected cellular telephone sets responds within the predetermined time, the incoming call is completed with the responding cellular telephone set.

According to another embodiment of the inventive technique, after MMSC determines that the cellular telephone line in an incoming call is associated with multiple cellular telephones, MMSC produces a speech signal representing a menu as shown in step 540 of FIG. 6D, such as:

"Please press 1 for Jane in product information, 2 to place an order, 3 for John in customer service, 4 for Ms. Smith and 5 to hear these choices again"

and delivers this menu to the caller. The "spoken" identification information associated with the extensions is defined by the customer when the customer enrolls cellular telephones for the cellular extension service. For example, if the caller presses 1, 2 or 3, a call setup is directed to cellular telephone 112, 114 or 122, respectively, at steps 542–546.

The above described embodiment is akin to conventional business extension telephone lines with an automated switchboard.

Outgoing Calls

If an extension cellular telephone tries to use its associated cellular telephone line while it is unused by other associated cellular telephones, then the usage attempt is processed in a generally conventional manner by MMSC.

The situation of a cellular telephone trying to use a cellular telephone line while a call is in progress with another cellular telephone sharing its cellular telephone line number will now be described. This situation is referred to herein as a cellular extension interrupt attempt.

Figure 7C:
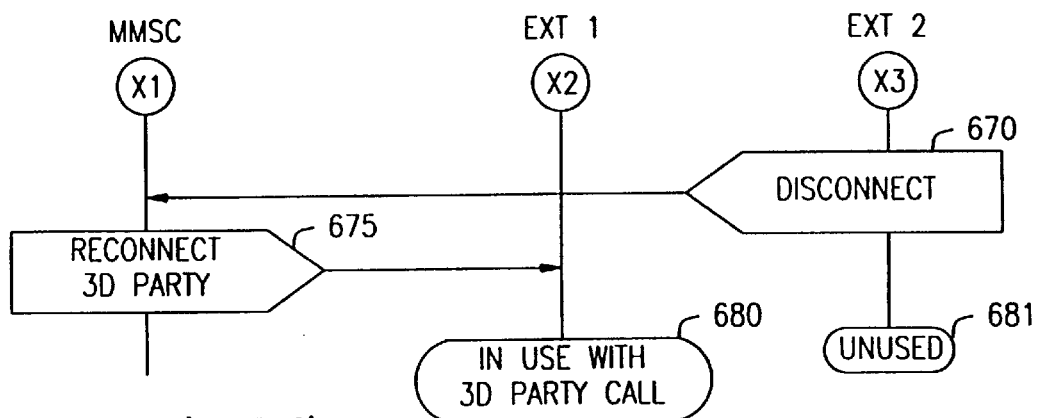
Figure 7D:
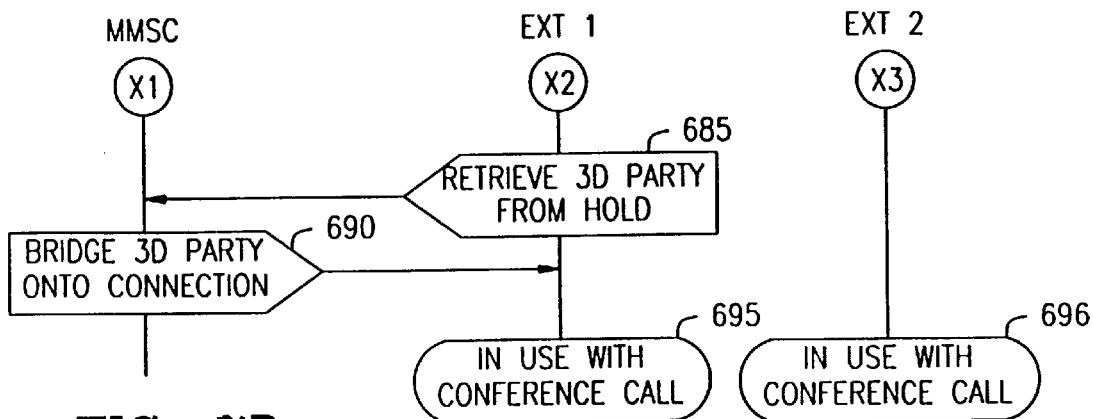

FIG. 7A shows the beginning of a cellular extension interrupt attempt, and FIGS. 7B–7D show different conclusions of the cellular extension interrupt attempt. Activity at MMSC and the two cellular telephones, labeled "EXT1" and "EXT2", is depicted in FIGS. 7A–7D.

Step 600 of FIG. 7A indicates that the first cellular telephone EXT1, such as cellular telephone 114, is using the cellular telephone line to conduct a call with a third party, such as a wire line telephone customer, and, at the same time, step 605 indicates that the second cellular telephone EXT2, such as cellular telephone 122 (or 112), is not in use.

At step 610, EXT2 attempts to place a call. MMSC receives the line usage attempt, and, at step 615, replies to EXT2 that the line is in use, and inquires whether an interrupt is desired. Specifically, the MMSC produces and transmits a speech signal to EXT2 such as:

"The line is in use by another extension telephone. Please try again later, or press 41 to interrupt at standard priority, or press 42 to interrupt at emergency priority."

At step 620, EXT2 responds to the MMSC that it wishes to interrupt. For example, EXT2 transmits "41" to MMSC At step 625, MMSC receives the interrupt request from EXT2, generates an interrupt signal in accordance with the interrupt request and delivers the interrupt signal to EXT1 during the call in progress between EXT1 and the third party. One tone sequence (or, more generally, a first predetermined signal) is used for a standard priority interrupt; another tone sequence (or, more generally, a second predetermined signal) is used for an emergency priority interrupt. Only EXT1 "hears" the interrupt signal; that is, the third party is not exposed to the interrupt signal.

If the user of EXT1 wishes to deny the interrupt, the user simply does not respond. After a predetermined time, MMSC produces and transmits a speech signal to EXT2 indicating that the interrupt was not granted, and terminates the call. This situation is not shown in FIG. 7A, to avoid visual clutter.

As shown at step 630, the user of EXT1 may decide to grant the interrupt, It is assumed that the user notifies the third party that he or she will be put on hold, and then, within a predetermined time after receiving the interrupt signal, the user enters an interrupt accept code, such as "22". MMSC receives the interrupt accept code, and, at step 635, places the third party on hold. Then, at step 640, MMSC connects EXT1 and EXT2.

It is assumed that the users of EXT1 and EXT2 converse, and then several situations are possible. FIGS. 7B–7D each show different conclusions to the cellular extension interrupt depicted in FIG. 7A. Other possibilities will be apparent to one of ordinary skill in the art.

As shown in FIG. 7B, the user of EXT2 decides that the user of EXT2 ought to have the line immediately, and so, at step 645, EXT1 transmits a disconnect signal to MMSC MMSC receives the disconnect signal from EXT1, and, at step 650, drops the third party. In some embodiments, MMSC generates a message to the held party such as, "Your call was terminated by the other party." before dropping the third party. At step 655, MMSC grants line usage to EXT2. At step 660, EXT2 places a call. Consequently, the cellular extension interrupt concludes with EXT1 not in use, and EXT2 in use for a new call.

As shown in FIG. 7C, the user of EXT2 decides that he or she will not use the line, and, at step 670, EXT2 transmits a disconnect signal to MMSC MMSC receives the disconnect signal from EXT2, and, at step 675, reconnects the third party and EXT1. Consequently, the cellular extension interrupt concludes as it began, that is, with EXT1 using the cellular telephone line to conduct a call with the third party, and with EXT2 not in use.

As shown in FIG. 7D, the users of EXT1 and EXT2 decide that they would like to have a conference call with the third party who is on hold. One of EXT1 and EXT2, such as EXT1, enters a conference signal or a "retrieve held party" signal, such as "26". At step 685, EXT1 transmits the signal. MMSC receives the transmitted signal, and at step 690, bridges the held third party onto the call between EXT1 and EXT2. Consequently, the cellular extension interrupt concludes with the users of EXT1 and EXT2 and the third party having a conference call.

Screened interrupts is a service available to cellular telephones associated with the same cellular telephone line number. Specifically, to configure a first cellular telephone for screened call waiting, the customer indicates which of the other cellular telephone sharing its cellular telephone line number are not permitted to request an interrupt from the first cellular telephone. The customer indicates whether the interrupt screening is to be in effect for the duration of the next call, or until the customer "unscreens" the interrupts.

Intercom Calls

The situation of a cellular telephone trying to set up a call with another cellular telephone sharing the same cellular telephone line will now be described.

Let it be assumed that the user of cellular telephone 114 wishes to call cellular telephone 112 and that users of cellular telephones sharing the same cellular telephone line have previously agreed on intercom extension numbers for each of the cellular telephones. MMSC contains a table of the intercom extension numbers, as generally shown in FIG. 8.

The caller enters a predefined code followed by the intercom extension number of cellular telephone 112 and transmits this sequence to MMSC. MMSC receives the sequence, uses the table depicted in FIG. 8 to obtain the corresponding TID for cellular telephone 112, and tries to set up a call to cellular telephone 112.

Alternatively, the user of cellular telephone 114 enters a different predefined code to get a menu and transmits this code to MMSC MMSC receives the code, and produces and transmits a speech signal to cellular telephone 114 which recites the intercom extension numbers and identifying information, such as;

"Press 1 for Jane's line, 2 for John's line, 3 for the children's line, 4 to hear these choices again".

The user of cellular telephone 114 enters a selection and transmits it to the MMSC.

MMSC receives the selection, translates the intercom extension number to a TID, and as described above, tries to set up a call to the cellular telephone corresponding to the selection.

Additional cellular telephones sharing the cellular telephone line number can be bridged onto the call in similar fashion.

If one of the cellular telephones participating in the call is configured for conference, then third parties, such as wire line telephones, can be bridged onto the call.

If a cellular telephone sharing the cellular telephone line number but not participating in the call wishes to use the line, it can initiate a cellular extension interrupt attempt, as described above with respect to FIGS. 7A–7D.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

The invention claimed is:

1. A method for configuring cellular telephones to share a cellular telephone line number, the method comprising the steps of:

defining one of the cellular telephones as a parent and the other cellular telephones as extensions, each of the cellular telephones being associated with a separate data record;

including identification information for the extension cellular telephones in the data record associated with the parent cellular telephone, the data record associated with the parent cellular telephone being located in a central facility; and including identification information for the parent cellular telephone in the data records associated with the extension cellular telephones, the extension cellular telephones being devoid of associations with other cellular telephone line numbers.

2. A cellular communication system having a parent cellular telephone and at least one extension cellular telephone which share a cellular telephone line number, the system comprising:

a memory for storing identification information for the extension cellular telephones in a data record associated with the parent cellular telephone, the data record associated with the parent cellular telephone being located in a central facility; and a memory for storing identification information for the parent cellular telephone in data records associated with the extension cellular telephones, each of the cellular telephones being associated with a separate data record, the extension cellular telephones being devoid of associations with other cellular telephone line numbers.

3. A method for configuring cellular telephones to share a cellular telephone line number, the method comprising the steps of:

defining one of the cellular telephones as a parent and the other cellular telephones as extensions, each of the cellular telephones being associated with a separate data record;

storing a data record for one of the parent or the extensions in a centralized control facility, wherein said data record associated with the parent includes identification information for the extensions, and said data records associated with the extensions include identification information for the parent; and storing a record associating the shared cellular telephone line number with the parent and the extensions, the extensions being devoid of associations with other cellular telephone line numbers.

4. A cellular communication system having a parent cellular telephone and at least one extension cellular telephone which share a cellular telephone line number, the system comprising:

a memory for storing a data record for one of the parent or extension cellular telephones, the memory being located in a central facility, each of the cellular telephones being associated with a separate data record, wherein said data record associated with the parent cellular telephone includes identification information for the extension cellular telephones, and said data records associated with the extension cellular telephones include identification information for the parent cellular telephone; and a memory for storing a record associating the shared cellular telephone line number with the parent and extension cellular telephones, the extension cellular telephones being devoid of associations with other cellular telephone line numbers.

5. A method for setting up a call from a caller to a cellular telephone line number having a plurality of associated cellular telephones, the method comprising the steps of:

delivering an audible menu signal to the caller;

receiving a response signal from the caller;

translating the response signal to a selected one of the cellular telephones associated with the cellular telephone line number, each of the cellular telephones having a unique electronic serial number and being associated with a separate data record, each of the associated cellular telephones being devoid of associations with other cellular telephone line numbers; and delivering a call setup signal to the selected cellular telephone.

6. A method for a first cellular telephone to interrupt a call in progress of a second cellular telephone, the call in progress of the second cellular telephone being with a third party, the method comprising the steps of:

receiving, at a central facility, an interrupt request signal from the first cellular telephone, the first and second cellular telephones sharing a cellular telephone line number, each of the cellular telephones having a unique electronic serial number and being associated with a separate data record, producing, at the central facility, an interrupt notice signal, transmitting the interrupt notice signal from the central facility to the second cellular telephone, and placing the third party on hold.

7. A method for a first cellular telephone to place a call to a second cellular telephone, the method comprising the steps of:

receiving, at a central facility, an intercom extension number associated with the first cellular telephone from the second cellular telephone, the first and second cellular telephones sharing a cellular telephone line number, each of the cellular telephones having a unique electronic serial number and being associated with a separate data record, and each of the cellular telephones devoid of associations with other cellular telephone line numbers, and delivering a call setup request to the first cellular telephone.

8. A communication system for a first cellular telephone to place a call to a second cellular telephone, the system comprising:

an interface, at a central facility, for receiving an intercom extension number associated with the first cellular telephone from the second cellular telephone, the first and second cellular telephones sharing a cellular telephone line number, each of the cellular telephones having a unique electronic serial number and being associated with a separate data record, and each of the cellular telephones devoid of associations with other cellular telephone line numbers, and communication facilities for delivering a call setup request to the first cellular telephone.

9. A method for configuring a plurality of cellular telephones to share a cellular telephone number, the method comprising the steps of:

including the cellular telephone number in a first data record associated with a selected one of the cellular telephones, each of the cellular telephones being associated with a separate data record, the first data record being located in a central facility; and including information identifying the selected one of the cellular telephones in the data records associated with the other of the cellular telephones, the other of the cellular telephones being devoid of associations with other cellular telephone line numbers.

10. A cellular communication system having a plurality of cellular telephones sharing a cellular telephone number, the system comprising:

a memory located at a central facility for storing the cellular telephone number in a first data record associated with a selected one of the cellular telephones, and a memory located at the central facility for storing information identifying the selected one of the cellular telephones in data records associated with the other of the cellular telephones, each of the other of the cellular telephones being associated with a separate data record, the other of the cellular telephones being devoid of associations with other cellular telephone line numbers.

11. The method for configuring cellular telephones of claim 1 wherein the parent cellular telephone is defined by the presence of the cellular telephone line number in the associated data record.

12. The method for configuring cellular telephones of claim 1 wherein each extension cellular telephone is defined by the presence of an extension telephone field and the cellular telephone line number of the parent cellular telephone in the associated data record.

* * * * *